Jan. 21, 1969     P. J. SELGIN     3,423,592
DISTANCE MEASURING MEANS USING LIGHT BEAMS
Filed Aug. 26, 1964

PAUL J. SELGIN
INVENTOR
BY Ralph E. Bitner
ATTORNEY

United States Patent Office 3,423,592
Patented Jan. 21, 1969

3,423,592
DISTANCE MEASURING MEANS USING LIGHT BEAMS
Paul J. Selgin, Bethel, Conn., assignor to Automatic Control Devices, Inc., a corporation of Connecticut
Filed Aug. 26, 1964, Ser. No. 392,214
U.S. Cl. 250—204                                5 Claims
Int. Cl. G01j 1/36

ABSTRACT OF THE DISCLOSURE

A measuring instrument is described which employs two light beams to determine the position of an upper surface of an object. One light beam is directed across the surface of the object and is automatically adjusted for grazing incidence. The other beam is a reference. To adjust the position of the beams, the difference between the intensities of the two beams is measured by two photosensitive transducers and the resulting electrical current is applied to an electric motor which moves an indicating means and the first light beam until there is no difference between the intensities of the two beams.

---

This invention relates to an optical measuring instrument for determining the position of an object in space relative to a base. The invention has particular reference to a means for quickly determining the position of a surface which may be moving in a linear manner or which may be part of a rotating mechanism. The invention employs a light beam, a series of photosensitive transducers, and a movable casing for making the measurement.

Many attempts have been made to measure the distance between a flexible object and a reference base. Some of these devices include a flat surface pressed against the object. Others have used a contact wheel to determine the position of the surface. All such mechanical contact means distort the surface of the object being measured and for this reason do not give a correct reading. The present invention uses a light beam making grazing contact with the surface of the object. It is not subject to precise focussing adjustments because the beam is not focussed into an image but instead comprises a narrow beam of light containing rays that are substantially parallel to each other. The measurement is automatic and the mechanism adjusts the light beam so that it is always bisected when a balance is obtained.

One of the objects of this invention is to provide an improved optical measuring instrument which avoids one or more of the disadvantages and limitations of prior art arrangements.

Another object of the invention is to measure the position of an object without the use of mechanical force applied to the object.

Another object of the invention is to provide an optical means for measuring the position of a surface on an object which is resilient.

Another object of the invention is to provide a measuring instrument which does not depend upon the accurate focussing of a beam of light into a small image.

Another object of the invention is to provide a self-adjusting measuring instrument which can be arranged to cover a wide range of distances.

The invention includes a source of light which produces two light beams. One light beam is focussed into a bundle of parallel light rays and is directed through a space across the surface of the object to be measured. A second light beam is used as a reference and eliminates the need for a constant adjustment of lamp current. The two light beams are measured by two photosensitive transducers and the difference registered by these components is applied to an amplifying system which actuates a relay. The relay contains contacts coupled between a source of electric power and a motor and the relay acts to switch positive and negative power to the motor in response to the differences of the photosensitive components. The motor is connected by a gear reduction means to a nut which either advances the light beam toward the object or pulls it away from the object.

One of the features of this invention is a second relay which is operated through a pulse responsive circuit and changes the resistance in series with the motor to alter its speed whenever the frequency applied to the motor is above a predetermined frequency value.

For a better understanding of the present invention, together with other and further objects thereof, reference is made to the following description taken in connection with the accompanying drawings.

Figure 1:
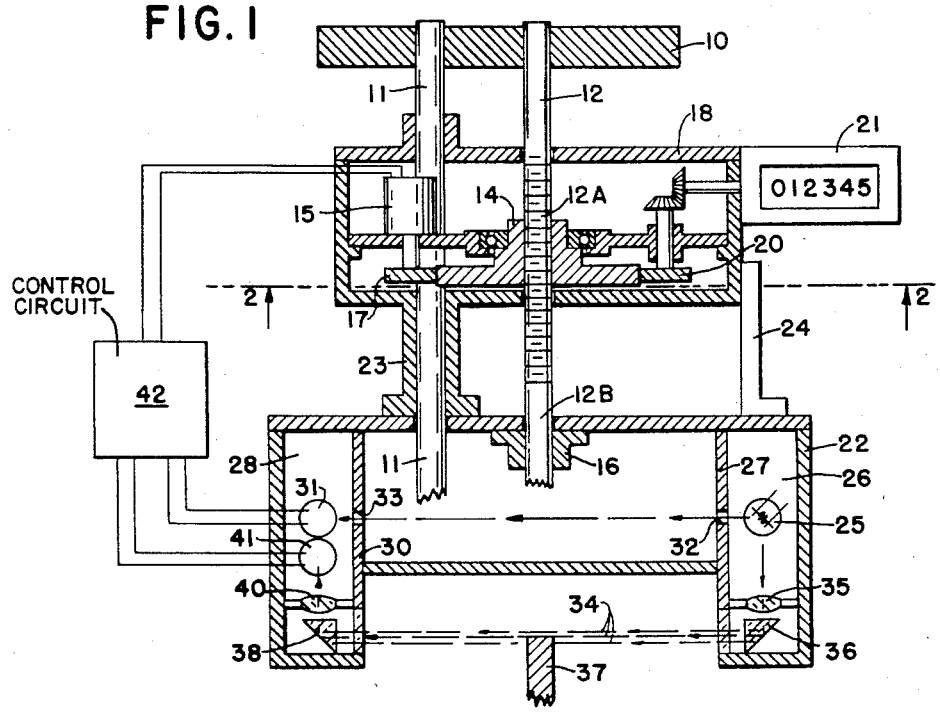
FIG. 1 is a cross sectional view of the measuring device.
Figure 2:
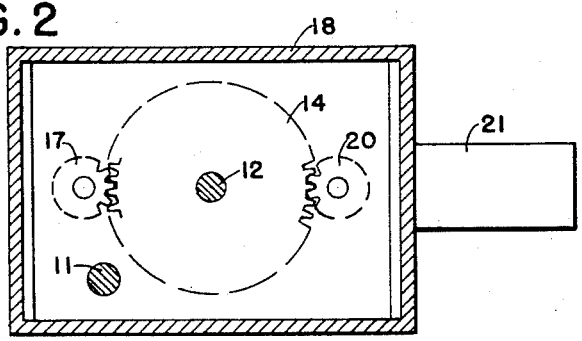
FIG. 2 is a cross sectional view of a portion of the mechanism shown in FIG. 1 and is taken along line 2—2 of that figure.

Referring now to FIGS. 1 and 2, the invention includes a base 10 which is the basis for all measurements. Secured to the base is a shaft 11 on which the moving mechanism slides. A screw 12 is also secured to the base with its mid-portion 12A meshed with a nut 14 which is turned by a motor 15. The other end 12B of the shaft slides in a bearing 16. The motor 15 and its pinion 17, together with the nut 14 are enclosed in a first portion 18 of a casing which moves along shaft 11 and screw 12 when the nut 14 is turned. The casing 18 also contains a second pinion 20 which is connected to an indicating device 21 giving a visual indication of the position of casing 18 with respect to the base 10.

The first portion 18 is secured to a second portion 22 of the casing which houses the optical components. The two portions may be secured to each other by the shaft bearing 23 and an angle brace 24. Other mechanical coupling means can be used. Within the second portion of the casing, a lamp 25 is positioned in a first compartment 26 so that its light shines through a first compartment wall 27 to a second compartment 28. In the second compartment behind wall 30 is a first photosensitive transducer 31 which receives light directly from lamp 25 through two apertures 32 and 33. This is the reference device which compensates for any variations in line voltage or in lamp characteristics.

A second beam of light, denoted by arrows 34, is given off by the lamp 25 and is first focussed into a beam by lens 35 and reflected by a prism 36. This beam of light 34 moves between compartments 22 and 28 and somewhere between the two compartments the beam grazes the top surface of an object 37. After leaving the object, the light beam enters compartment 28, is reflected by prism 38, and again focussed by a second lens 40, finally striking the second photosensitive transducer 41.

Figure 3:
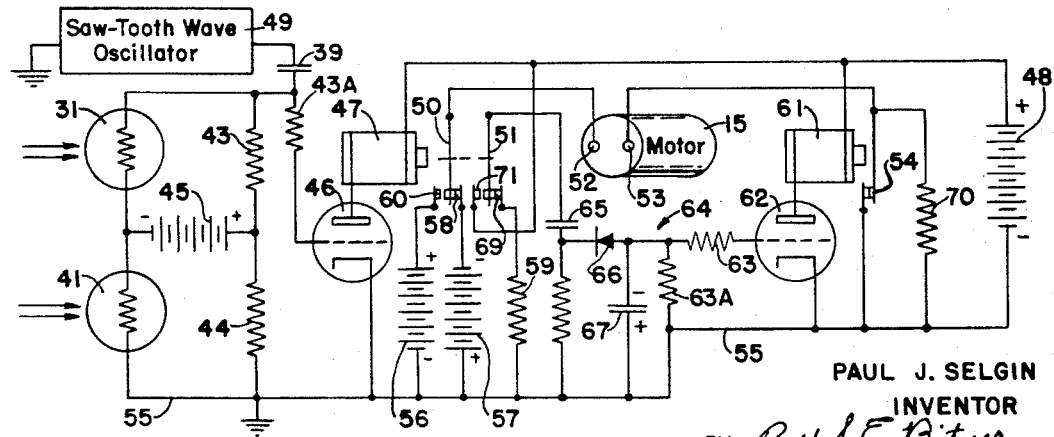
FIG. 3 is a schematic diagram of connections showing the amplifier circuit which receives its input from the transducers and applies its output to the motor.

The two transducers 41 and 31 are connected to a control circuit 42, shown in block in FIG. 1 and in detail in FIG. 3. The operation of the device shown in FIGS. 1 and 2 will be apparent when the operation of the circuit shown in FIG. 3 is described.

Referring now to FIG. 3, the control circuit includes transducers 31 and 41 connected in opposition by resistors 43 and 44 and supplied with current from a source of direct current power 45 which may be a battery. The transducer ends of resistors 43 and 44 are connected respectively to the control electrode, in series with resistor 43A, and cathode of a vacuum tube triode 46. It is obvious that one or more transistors may be used in place of the triode. The control electrode of triode 46 is coupled to a saw-tooth generator 49 by means of series capacitor 39. The saw-tooth wave modulates whatever signal is received from the transducers 31, 41, and even when no signal is received from the transducers, the anode-cathode current is modulated in accordance with a saw-tooth wave. The anode of triode 46 is connected in series with a relay winding 47 and a direct current source of potential 48. The relay winding operates two armatures 50 and 51, each of which in turn operates two pairs of contacts. Armature 50 is connected to one terminal 52 of motor 15 while the other terminal 53 is connected through another pair of contacts 54 to a ground or common conductor 55. Conductor 55 is also connected to the terminals of two sources of potential 56 and 57. The contacts on armature 50 are arranged so that, when the relay winding 47 does not pass current, the motor 15 is connected through one pair of contacts 58 to battery 57. If the relay is actuated, contacts 58 are broken and a second pair of contacts 60 is closed, thereby sending current from the second source of electric power 56 to motor 15 to cause it to turn in the opposite direction. In this manner the direction of the motor is controlled to turn so that portion 22 may be lowered, or when the contacts are operated to turn in the reverse direction, to raise portion 22 and move it away from the object being measured.

The contacts on armature 51 are arranged so that when the relay is actuated, contacts 71 are closed and the positive terminal of source 48 is connected to capacitor 65, and when the relay is normalized, contacts 69 are closed, connecting capacitor 65 to ground through resistor 59. When relay 47 is operating at high speed near the balance point, the contacts on armature 51 produce a series of pulses which are passed by capacitor 65, rectified by diode 66, and applied to the control electrode of triode 62. As the train of pulses is received, storage capacitor 67 is charged to a negative potential, reducing the potential of the control electrode of triode 62 to the cut-off potential and reducing the current through relay winding 61 so that contacts 54 are opened and resistor 70 is introduced into the motor circuit, slowing down its operation. The negative voltage remains on capacitor 67 until it leaks off through resistor 63A.

Relay winding 61 normally carries current from triode 62 since its control electrode is normally at the same potential as its cathode. Contacts 54 are then normally closed and resistor 70 is short-circuited. When triode 62 is made non-conductive, contacts 54 are opened and resistor 70 is connected in series with motor terminal 53.

When this circuit is connected to the two light transducers 31 and 41, the operation is as follows: when the illumination on transducer 31 is considerably greater than the illumination on transducer 41, current through resistor 43 raises the potential of the control electrode of triode 46 and the additional current through the anode-cathode actuates relay 47, closing contacts 60 and 71. Under these conditions, the application of saw-tooth wave from generator 49 has practically no effect. Since no pulses are transmitted to circuit 64 and triode 62, relay 61 remains in its actuated position and resistor 70 is short-circuited, permitting the motor to run at maximum speed.

Motor 15 turns, moving casing 22 to equalize the beams, and when a near balance is produced, the saw-tooth wave predominates, applying a reversal of potentials on the control electrode of triode 46. This condition sends unidirectional pulses to relay winding 47, causing chattering of the armatures and applying a series of pulses to the pulse responsive circuit 64, cutting off the anode-cathode current and opening contacts 54. This connects resistor 70 in the circuit and slows down the motor, thereby preventing hunting. However, at a balance, when the transducers pass the same current, relay armatures 50 and 51 operate at the frequency of the saw-tooth generator. If relay contacts 60 are closed for the same time interval as contacts 58, the motor receives equal positive and negative pulses and does not turn.

The operation of the light beam in connection with object 37 is obvious from the drawing. When the reflected beam through reflectors 36 and 38 produces a greater illumination on transducer 41 than the direct beam produces on transducer 31, motor 15 turns the nut 14 so that the light casing 22 is lowered and the object 37 cuts off about half of the light beam 34. When the illumination on both transducers is equal, the motor stops and indicator 21 shows the spacing between base 10 and the object 37. It is obvious that the indicator may be set so that the measurement is between the object and some other predetermined base line or base surface.

The foregoing disclosure and drawings are merely illustrative of the principles of this invention and are not to be interpreted in a limiting sense. The only limitations are to be determined from the scope of the appended claims.

I claim:

1. A self-adjusting optical measuring instrument comprising; a base for defining a surface from which measurements are to be made; a screw secured to the base and disposed perpendicular to the base surface; a movable casing slidably mounted on a shaft which is secured to the base; a nut meshing with said screw and rotatably supported within said casing; a reversible motor coupled to said nut for rotating it in either direction, a source of illumination mounted within the casing and movable with it; an optical system which directs a first beam of light from the source through a space where the beam may be intercepted by the edge of an object whose distance from the base is to be measured; a first light sensitive transducer adapted to produce an electrical signal when activated by a change in illumination, said transducer mounted adjacent to the source of illumination and adapted to receive light directly from it; a second light sensitive transducer adapted to produce an electrical signal when activated by a change in illumination, said second transducer also mounted in the casing and adapted to receive light from the optical system; an amplifying system means coupled between the transducers and the motor for applying an electrical signal from the transducers to the motor to control the motor to run in one direction and lower the optical system when the first transducer receives more light than the second transducer, and to run the motor in a reverse direction and raise the optical system when the second transducer receives more light than the first transducer, and an oscillator which produces a saw-tooth wave coupled to the input terminals of the amplifying system for modulating the signal received from the transducers and for supplying the motor with a series of reversing pulses when the illumination received by said transducers is equal.

2. An optical measuring instrument as claimed in claim 1 wherein said first light sensitive transducer receives its illumination only from said source after passing through at least one aperture.

3. An optical measuring instrument as claimed in claim 1 wherein said optical system includes two mirrors mounted in the path of the first beam of light on either side of the object whose distance from the base is to be measured, said mirrors adapted to reflect the first beam of light from the source to the first transducer.

4. An optical measuring instrument as claimed in claim 1 wherein said amplifying system includes an output circuit connected to a relay winding; said relay winding adapted to operate relay contacts which are connected to two sources of direct current power and are adapted to apply positive and negative direct current pulses to the motor to control its direction of rotation.

5. An optical measuring instrument as claimed in claim 4 wherein a pulse responsive amplifier circuit has an input circuit coupled to the relay contacts which produce the series of direct current pulses, said amplifier circuit having its output connected to a second relay having contacts which are connected across a resistor connected in series with the motor for slowing down the motor when the system approaches a balanced condition.

References Cited

UNITED STATES PATENTS

| | | | |
|---|---|---|---|
| 2,471,075 | 5/1949 | Montrose-Oster | 318—29 |
| 2,604,004 | 7/1952 | Root. | |
| 2,777,069 | 1/1957 | Saeman | 250—210 X |
| 2,872,588 | 2/1959 | Barton | 250—210 |
| 2,933,973 | 4/1960 | Ask | 88—14 |
| 3,029,348 | 4/1962 | Heinz. | |
| 3,260,912 | 7/1966 | Gregory | 318—341 |
| 2,818,726 | 1/1958 | Amonette et al. | 73—4 |

JEWELL H. PEDERSEN, *Primary Examiner.*

A. A. KASHINSKI, *Assistant Examiner.*

U.S. Cl. X.R.

250—219; 356—167